(12) United States Patent
Acriche et al.

(10) Patent No.: US 11,682,030 B2
(45) Date of Patent: Jun. 20, 2023

(54) AUTOMATIC LISTING OF ITEMS BASED ON USER SPECIFIED PARAMETERS

(71) Applicant: eBay Inc., San Jose, CA (US)

(72) Inventors: Yoni Acriche, Austin, TX (US); Yo Han Park, Seoul (KR); Hwangmin Shin, Seoul (KR)

(73) Assignee: EBAY INC., San Jose, CA (US)

( * ) Notice: Subject to any disclaimer, the term of this patent is extended or adjusted under 35 U.S.C. 154(b) by 71 days.

(21) Appl. No.: 16/185,667

(22) Filed: Nov. 9, 2018

(65) Prior Publication Data
US 2020/0151743 A1 May 14, 2020

(51) Int. Cl.
G06Q 30/02 (2012.01)
G06F 3/0481 (2022.01)
G06Q 30/0202 (2023.01)
G06Q 30/0201 (2023.01)

(52) U.S. Cl.
CPC ....... *G06Q 30/0202* (2013.01); *G06F 3/0481* (2013.01); *G06Q 30/0206* (2013.01)

(58) Field of Classification Search
None
See application file for complete search history.

(56) References Cited

U.S. PATENT DOCUMENTS

| 8,447,645 | B2 | 5/2013 | Rothman |
| 2003/0105728 | A1 | 6/2003 | Yano et al. |
| 2005/0262012 | A1* | 11/2005 | Mathews ............... G06Q 30/02 705/37 |
| 2011/0004509 | A1* | 1/2011 | Wu ..................... G06Q 30/0631 705/26.7 |
| 2013/0030870 | A1 | 1/2013 | Swinson et al. |

(Continued)

FOREIGN PATENT DOCUMENTS

| EP | 1089209 A2 | 4/2001 |
| JP | 2003-511758 A | 3/2003 |

(Continued)

OTHER PUBLICATIONS

Ip.Com, Automatic Management of On-Line Inventory for Enhancing Commerce Opportunities, IP.com Electronic Publication Date: Dec. 9, 2008, IP.com Prior Art Database Technical Disclosure (Year: 2008).*

(Continued)

*Primary Examiner* — Shelby A Turner
*Assistant Examiner* — Matthew H Divelbiss
(74) *Attorney, Agent, or Firm* — Schwegman Lundberg & Woessner, P.A.

(57) ABSTRACT

Methods and systems for automatic publication of listings on an ecommerce system are disclosed. In one aspects, a method include filtering historical item listings for items to those items having a similarity to a particular item, determining predictions of future sales prices over future time periods for the particular item based on the filtered historical items, the determined predictions including future sales prices having different probabilities of sale completion, receiving a user selection indicating one or more predictions of future sales prices over one or more future time periods; and determining a time to initiate publication of an on online listing for the particular item based on the selected one or more predictions.

13 Claims, 18 Drawing Sheets

(56) References Cited

U.S. PATENT DOCUMENTS

| | | | | |
|---|---|---|---|---|
| 2013/0073411 A1* | 3/2013 | Bhogal | ................. | G06Q 30/08 |
| | | | | 705/26.3 |
| 2014/0156445 A1 | 6/2014 | Seergy et al. | | |
| 2015/0186989 A1 | 7/2015 | Kneen et al. | | |
| 2017/0124635 A1 | 5/2017 | Shao | | |
| 2018/0182005 A1* | 6/2018 | Teo | ................... | G06Q 30/0601 |
| 2019/0272557 A1* | 9/2019 | Smith | ................ | G06Q 30/0224 |

FOREIGN PATENT DOCUMENTS

| | | | | |
|---|---|---|---|---|
| KR | 10-1061094 B1 | 8/2011 | | |
| WO | WO-2015100247 A1 * | 7/2015 | ............ | G06Q 30/02 |
| WO | 2018/116098 A1 | 6/2018 | | |
| WO | 2020/096658 A1 | 5/2020 | | |

OTHER PUBLICATIONS

International Search Report received for PCT Application No. PCT/US2019/041109, dated Nov. 27, 2019, 5 pages.
International Written Opinion received for PCT Application No. PCT/US2019/041109, dated Nov. 27, 2019, 7 pages.
International Preliminary Report on Patentability Received for PCT Patent Application No. PCT/US2019/041109, dated May 20, 2021, 9 pages.

* cited by examiner

NOTIFICATION

Brown Leather Little Kids Boots, Size 10

The current market price is 15% below predictions when you established a sale date of June 21, 2019. Do you want to change your sales strategy?

○ Yes, let's review sales strategy for this item now

○ No, maintain the same sales strategy, reduce sale price to maintain probability of sale ○ No, remind me later

NOTIFICATION

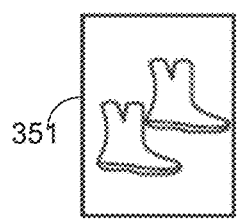

Brown Leather Little Kids Boots, Size 10

The current market price is 15% below predictions when you established a sale date of June 21, 2019. Do you want to change your resale strategy for this item?

○ Yes, change the resale date to February 6, 2019 to maintain retained value given the new predictions.

○ Maintain the sale date, I'll accept a lower retained value of $1,250.00.

○ Remind me later.

[ OK ]  [ Cancel ]

AUTOMATIC LISTING OF ITEMS BASED ON USER SPECIFIED PARAMETERS

TECHNICAL FIELD

The present disclosure generally relates to digital communications technology. Specifically, the disclosure is generally directed to methods of automatically publication of a listing based on one or more user specified parameters.

BACKGROUND

Many people purchase products with plans to resell them after using the products for a finite period of time. However, it is difficult for buyers to predict the best time to sell. Additionally, selling an item requires a certain amount of effort. Inertia may prevent a user from selling the item. Instead, the item may be given to a friend, sold locally, or given to charity. In some cases, even if a user has scheduled an appropriate sale time when they purchase a product, they may miss the time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

Various ones of the appended drawings merely illustrate example embodiments of the present disclosure and cannot be considered as limiting its scope.

FIG. 3B shows an example notification or alert generated in one or more of the disclosed embodiments.

DETAILED DESCRIPTION

Figure 1:
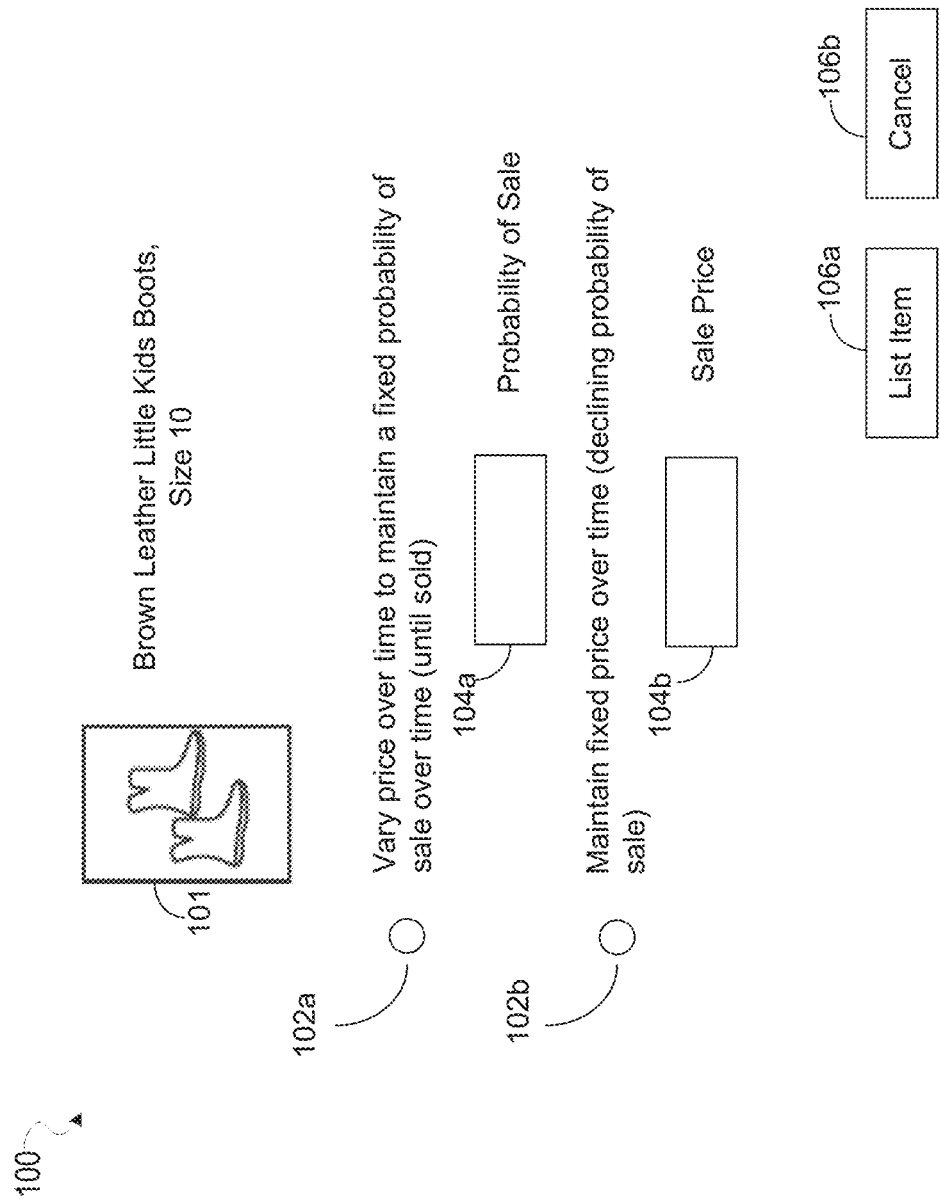
FIG. 1 is an example user interface that may be implemented in at least some of the disclosed embodiments.

Reference will now be made in detail to specific example embodiments for carrying out the inventive subject matter. Examples of these specific embodiments are illustrated in the accompanying drawings. It will be understood that these examples are not intended to limit the scope of the claims to the illustrated embodiments. On the contrary, they are intended to cover alternatives, modifications, and equivalents as may be included within the scope of the disclosure. In the following description, specific details are set forth in order to provide a thorough understanding of the subject matter. Embodiments may be practiced without some or all of these specific details.

As discussed above, a product may have a useful life for a user. For example, the user purchases a product and uses the product for some period of time, after which, use of the product diminishes. For example, a video game may be purchased by a user and used frequently soon after purchase. After some period of time, use of the video game may become less frequent than when the video game was new for the user. After the use of the product diminishes, it may be in the user's interest to re-sell the product. Re-selling the product allows the user to recapture at least some of the cost expended during the product purchase. Sale of unused items may also relieve the user of the burden of storing the unused item.

To solve the problem discussed above, the disclosed embodiments predict prices and sales probabilities of used goods at a time of purchase, and then automatically performs auto resale at an optimal time. This helps buyers avoid the above problems when selling items they have previously purchased. The disclosed embodiments also encourage buyers who have a resale plan to make a decision to buy. For example, if a buyer sees that a product he/she wants to buy is likely to be sold at 80% of the purchase price two years later, the buyer may move forward with the purchase, where without this information, the purchase may present too much risk for the buyer and they refrain from consummating the purchase.

The disclosed embodiments facilitate resale of items purchased by a user. Some of the disclosed embodiments facilitate resale by projecting future sales prices of the item, and advising the user of an appropriate time to sell the item based on the projected sales prices. The projections of future sales prices are based in part, on a database of completed sales maintained by an online listing system. The projections may be displayed in a graph of a user interface, allowing the user to visually understand how the value of their purchase varies over time, and to identify an appropriate resale strategy. In some embodiments, a database of typical use periods for a variety of products are maintained. Some embodiments issues alerts or reminders to users at the expiration of the use period to prompt the user to offer the product for resale.

Some embodiments provide for an intuitive user interface for selecting a future sales price and/or timeframe for the sale. For example, some embodiments receive touch inputs defining corners of a rectangle on the graph. The rectangle defines an area encompassing a period of time and sales prices during that time. In some embodiments, if a projected sales price for the item enters the rectangle, an online listing is automatically published at the indicated time. The image below demonstrates one possible embodiment of this approach:

Some of the disclosed embodiments may learn product usage times based on buying and selling behaviors of users. For example, a machine learning model may be employed that receives input including product type information, purchase dates, and resell dates. The machine learning model may then generate a prediction of a resell date based on other provided product type information and purchase dates. A variety of models may be used in various embodiments. For example, neural networks, decision trees, state vector machines, or other machine meaning methods may be employed in various embodiments. These predicted resell dates may then be used to trigger automatic listing of an item for resale, or at least a prompt of a user at a particular time, with the prompt inquiring as to whether the user wishes to list their product for resale.

FIG. 1 is an example user interface implemented in at least some of the disclosed embodiments. User interface 100 displays two options for selling an item shown in image 101. A first option 102a provides for selling an item based on a probability of sale. In other words, the disclosed embodiments generate predictions for selling an item at a set of prices over a period of time. As a price moves above the predicted price at a particular time, the probability that the sale will occur at that time will decrease. Similarly, as the price moves below the predicted price at the particular time, the probability that the sale will occur at that time will increase. By selecting the option 102a, the disclosed embodiments maintain a particular probability of sale, by varying the sales price over time in accordance with predicted sales prices. The particular probability of sale is entered via edit box 104a. The predicted sales prices is based, in some embodiments, on historical sales prices for similar products. Option 102b provides for the disclosed embodiments to maintain a fixed sales price over time. The fixed sales price is entered in list box 104b. A list item button 106a is used to list the item using the strategy defined by radio button(s) 102a-b. The cancel button 106b exits the user interface 100 without generating and publishing the listing for the item.

Figure 2:
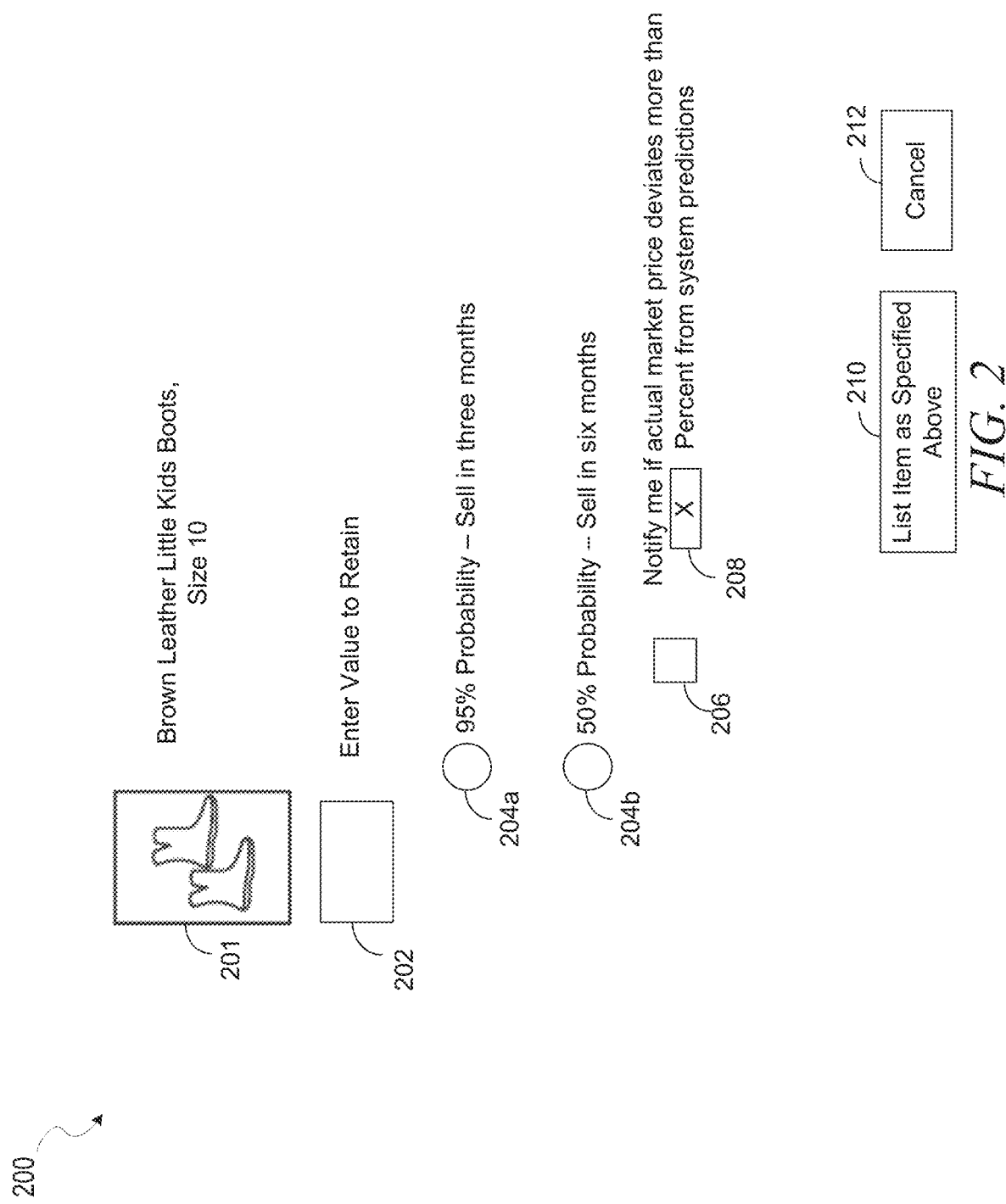
FIG. 2 is an example user interface implemented by at least some of the disclosed embodiments.

FIG. 2 is an example user interface implemented by at least some of the disclosed embodiments. The user interface 200 of FIG. 2 is implemented in some embodiments that sell an item so as to retain a particular residual value. For example, a user may wish to retain 80% of an item's original value. The original value is a purchase value in some aspects. In other words, the user purchases an item for a first value, and then seek to retain, for example, 80% of that first value when selling the item. The user interface 200 allows the user to enter the retained value in edit box 202. The value may be entered as a percentage or an absolute dollar amount.

Radio buttons 204a and 204b allow the user to select a sales probability of retaining the original value. By selecting radio button 204a, the disclosed embodiments will publish a listing for the item for sale within three months, and provide a 95% probability of retaining the value indicated in the edit box 202. By selecting radio button 204b, the disclosed embodiments publishes a listing for the item within six months, with a 50% probability of retaining the value indicated in edit box 202. While the example embodiment of FIG. 2 shows two choices with two probabilities of sale, other embodiments may provide 3, 4, 5, 6, 7, 8, 9, or 10 choices. In some aspects, the choice may not be selected via radio button, but instead via an edit box that allows entry of a probability of sale, anywhere within a continuous range of, for example, one percent to 100%. Corresponding timeframes for each probability of sale may also be displayed by the user interface 200 in these aspects. Similarly, while 95% and 50% probabilities are shown in FIG. 2, other embodiments, may show different choices for probabilities, such as 90%, 75%, and 60%.

User interface 200 also shows a check box 206. The check box 206 is configured to cause the disclosed embodiments to provide an alert to the user if an actual market price of the item 201 deviates more than a specified percentage from system predictions. In other words, if the market price deviates more than a percentage 208 from predictions present when the sales strategy is defined by the user interface 200, then an alert is provided to the user. The alert may be provided via email, text message, phone, social network message, or other messaging service. To facilitate detection of this condition, the disclosed embodiments may periodically recalculate predictions for the item 201. If the new predictions deviate enough from the predictions present at the time the user configured the automatic resale as defined by the user interface 200, it may be prudent for the user to reevaluate parameters they set for their automatic resale. For example, a user may setup an automatic resale on the premise that they have a 95% chance of retaining 80% of their value if they sell within three months. Later market prices may indicate that they only have a 40$ chance of retaining 80% of their value after three months. The user may want to accept this new reality, sell their item sooner, or perhaps decide to keep their item and not resell it, given they cannot retain as much of the value as they originally anticipated (e.g., they value the item higher than the revised market conditions indicate). FIG. 2 also shows a control 210 to list the item as specified above and a cancel control 212.

Figure 3A:
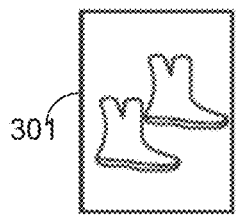
FIG. 3A shows an example notification or alert generated in one or more of the disclosed embodiments.
Figure 3A:
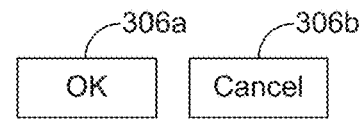

FIG. 3A shows an example notification or alert generated in one or more of the disclosed embodiments. The alert 300 may be implemented as an email, text, social networking message, pop up dialog box, or any other messaging interface. The alert 300 is for an item 301. The alert includes a message 302 indicating that a previous set alerting condition for the item 301 has been met. For example, the message 302 may indicate that conditions previously established via controls 206 and/or 208 of user interface 200 of FIG. 2 have been met.

The example alert 300 provides three options 304a-c for the user to select from. Selecting the option 304a provides for a review of the item 301's sale strategy. In some aspects, selecting the option 304a and then the OK button 306a causes the user interfaced 200 to be displayed for the item 301, allowing the user to reconfigure the sales and publication strategy for the item 301. Selection of the option 304b maintains the existing sales and publication strategy. Option 304b essentially ignores the alert 300. Selection of option 304c defers the alert to a later time. FIG. 3A also shows a cancel button 306b.

FIG. 3B shows a second example notification or alert generated by one or more of the disclosed embodiments. The alert 350 may be implemented as an email, text, social networking message, pop up dialog box, or any other messaging interface. The alert 350 is for an item 351. The alert includes a message 352 indicating that a previous set alerting condition for the item 351 has been met. For example, the message 352 may indicate that conditions previously established via controls 206 and/or 208 of user interface 200 of FIG. 2 have been met.

The example alert 350 provides three options 354a-c for the user to select from. Each option 354a-c is described via a respective message 364a-c. Selecting the option 354a updates the sales strategy to maintain a retained value of the item 351. Since the market price is below predictions, as indicated by the message 352, the sale date may need to be moved up to maintain the sale residual value as had been previously configured in the example of FIG. 3B. The message 364a indicates the new sale date (e.g. Feb. 6, 2018). Selecting the option 354b maintains the existing sales date, and the user acknowledges that the retained value may be lower. The message 364b provides the updated prediction of a retained value (e.g. $1250) if the existing sales date is maintained. Selecting option 354c defers the alert for a predetermined amount of time. FIG. 3B shows an OK button 356a and a cancel button 356b.

Figure 4:
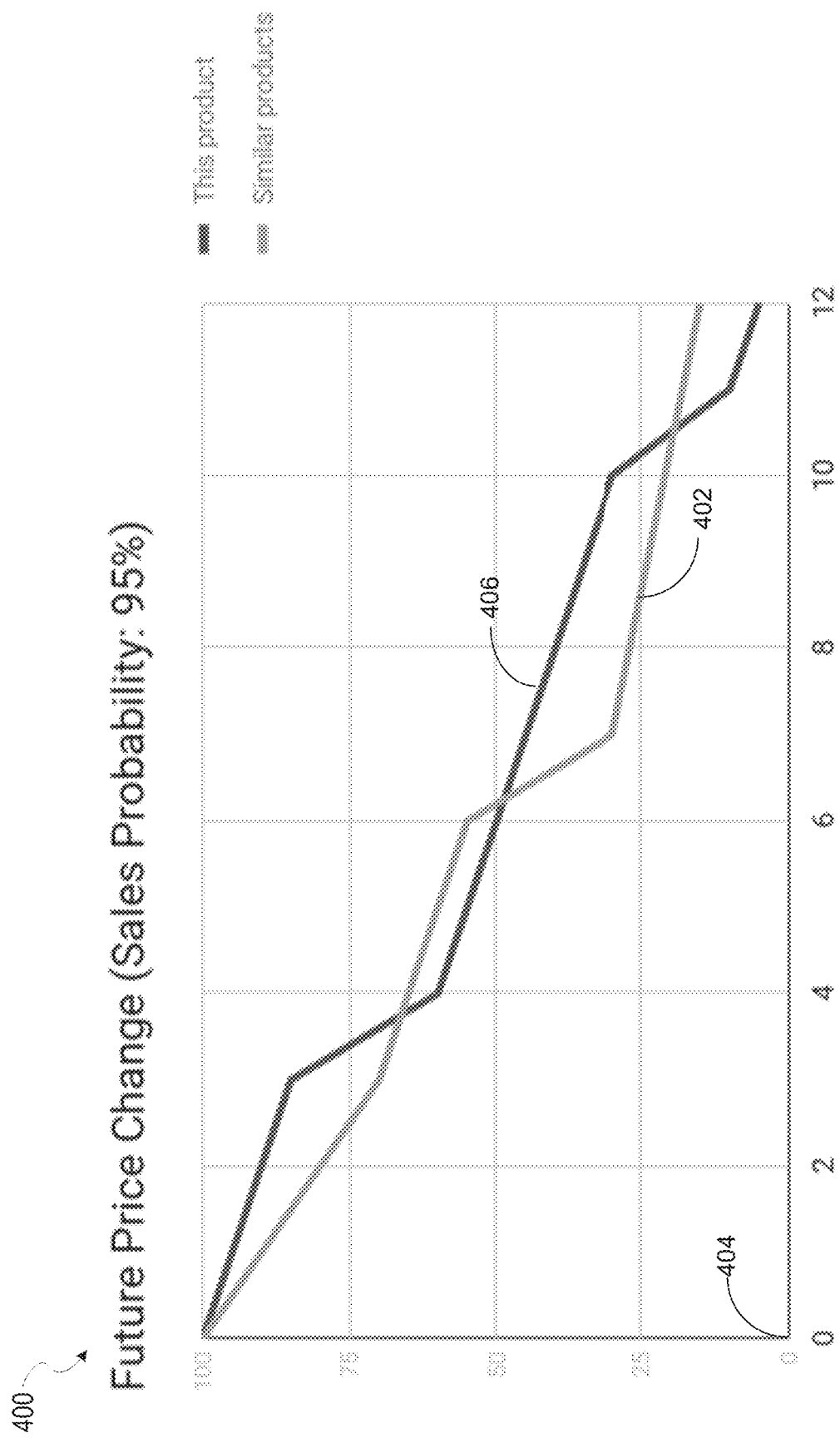
FIG. 4 shows a graph of example predictions of sales prices over time generated by one or more of the disclosed embodiments.

FIG. 4 shows a graph of example predictions of sales prices over time generated by one or more of the disclosed embodiments. FIG. 4 shows that the disclosed embodiments generate an aggregated history 402 of sales prices of products similar to an item. The history 402 is based on historical sales prices of similar items over time. For example, in some aspects, a zero time 404 on the graph 400 indicates when a set of similar products are purchased new. With each progressive unit of time to the right in graph 400, a resale price of the product decreases, as the product lives out its depreciation curve or lifecycle. This is reflected in the past sales prices 402. From the history of sales prices, the disclosed embodiments generate a prediction of future sales prices for a particular item, represented in the graph 400 as line 406. While the line 406 illustrates a single prediction of a sales price at a single point in time, some aspects may generate a prediction interval, which may provide a range of sales prices at a particular single point in time. The prediction interval may provide a certain confidence level that the sales price would fall within the interval or range provided by the prediction. For ease of illustration, such an interval is shown simply as a line in FIG. 4.

Some of the disclosed embodiments utilize the predictions represented by the line 406 when determining a sales strategy for an item. For example, the user interface 200 generates specific options (e.g. 204a-b) for retraining value of an item (e.g., as specified in edit box 202) based on predictions represented by the line 406. As one example, the line 406 represents predictions of a 90% probability of sale at the identified price at the identified time.

Figure 5:
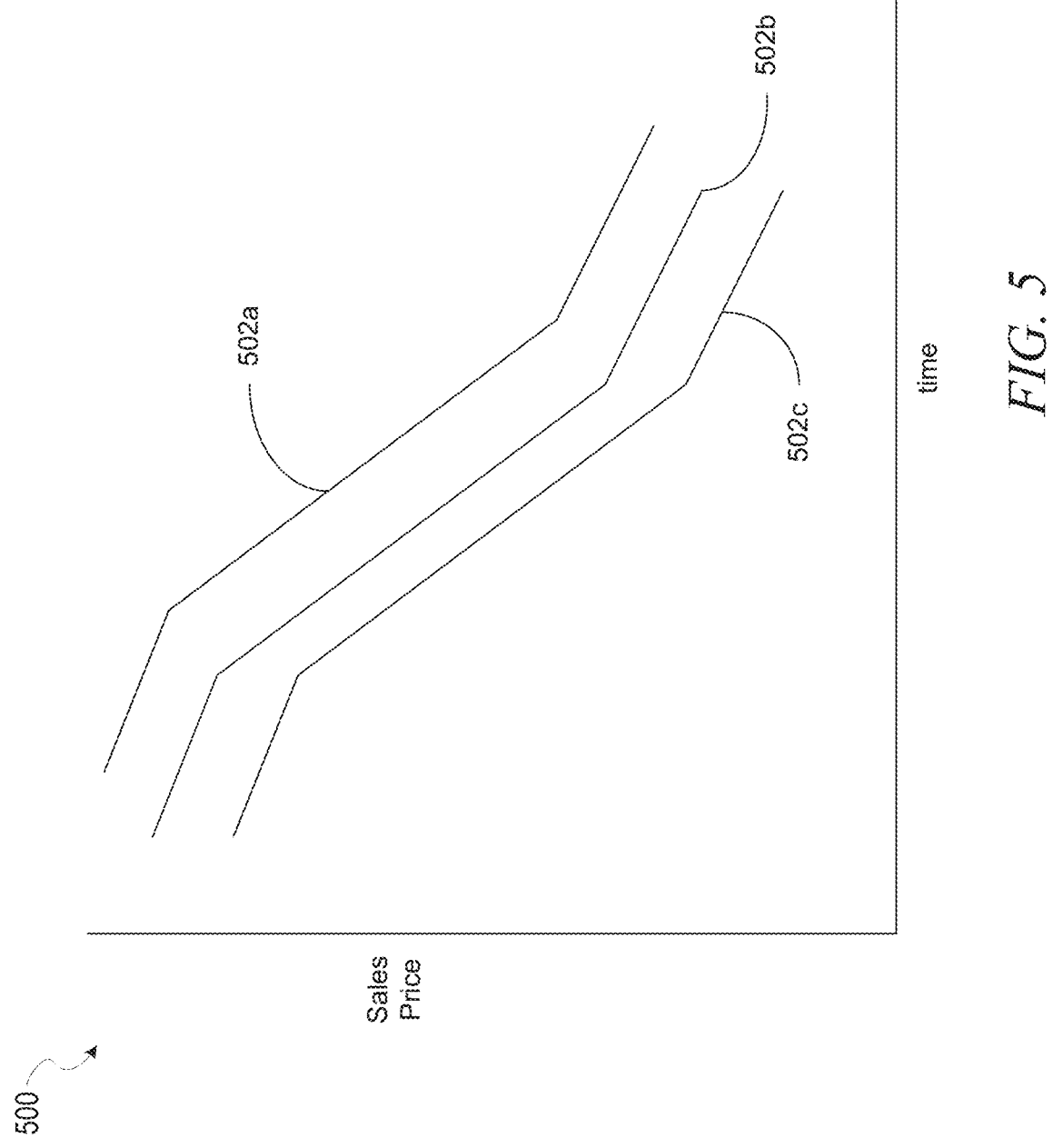
FIG. 5 shows example sales price predictions generated in some embodiments.

FIG. 5 shows example sales price predictions generated in some embodiments. Graph 500 shows three lines 502a-c indicating three sales price predictions for an item. While each of the three lines 502a-c generally communicate a single sales price prediction and a particular point in time, some of the disclosed embodiments may generate prediction intervals, which may provide a range or interval of sales prices at a single point of time, along with a confidence level that a sales price would fall within the provided range at that single point of time. For ease of illustration, FIG. 5 simplifies the intervals and shows the three lines 502a-c, which may represent three different prediction intervals at three different confidence levels.

Each of the lines 502c represents a different (e.g. median) probability of sale at the indicated price and the indicated time. For example, since line 502a predicts higher prices than either of lines 502b or line 502c, line 502a's prediction of sales prices may provide for a lower probability of sale (a first probability) than either of line 502b (a second probability of sale>the first probability of sale) and line 502c (a third probability of sale>the first probability of sale and also >the second probability of sale).

Figure 6:
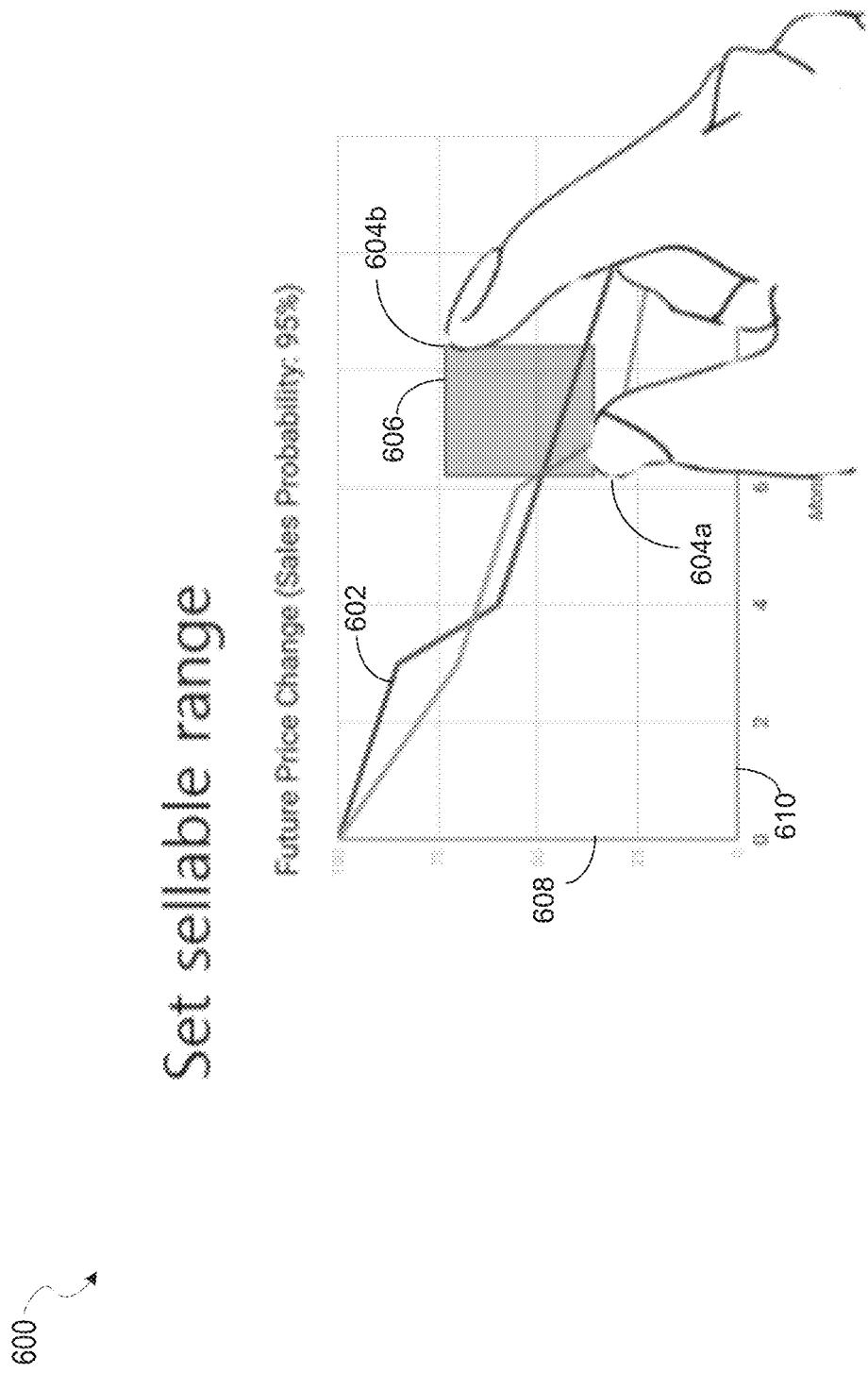
FIG. 6 shows a user interface that allows a user to select a range of prices over time for a sale of a product.

FIG. 6 shows a user interface that allows a user to select a range of prices over time for a sale of a product. The interface 600 shows a graph of predicted sales prices 602. User interface 600 shows a user providing two touch inputs 604a and 604b that define a rectangle 606. The rectangle 606 defines a region of the graph representing combinations of times from the x axis 608, and prices from the y axis 610. In some aspects, the inputs 604a and 604b define combinations of times and prices under which a listing for an item may be published. Predictions of future sales prices over time may be displayed on the graph 600, as shown, to assist the user in making their selection of a region (e.g., the rectangle 606.

Figure 7:
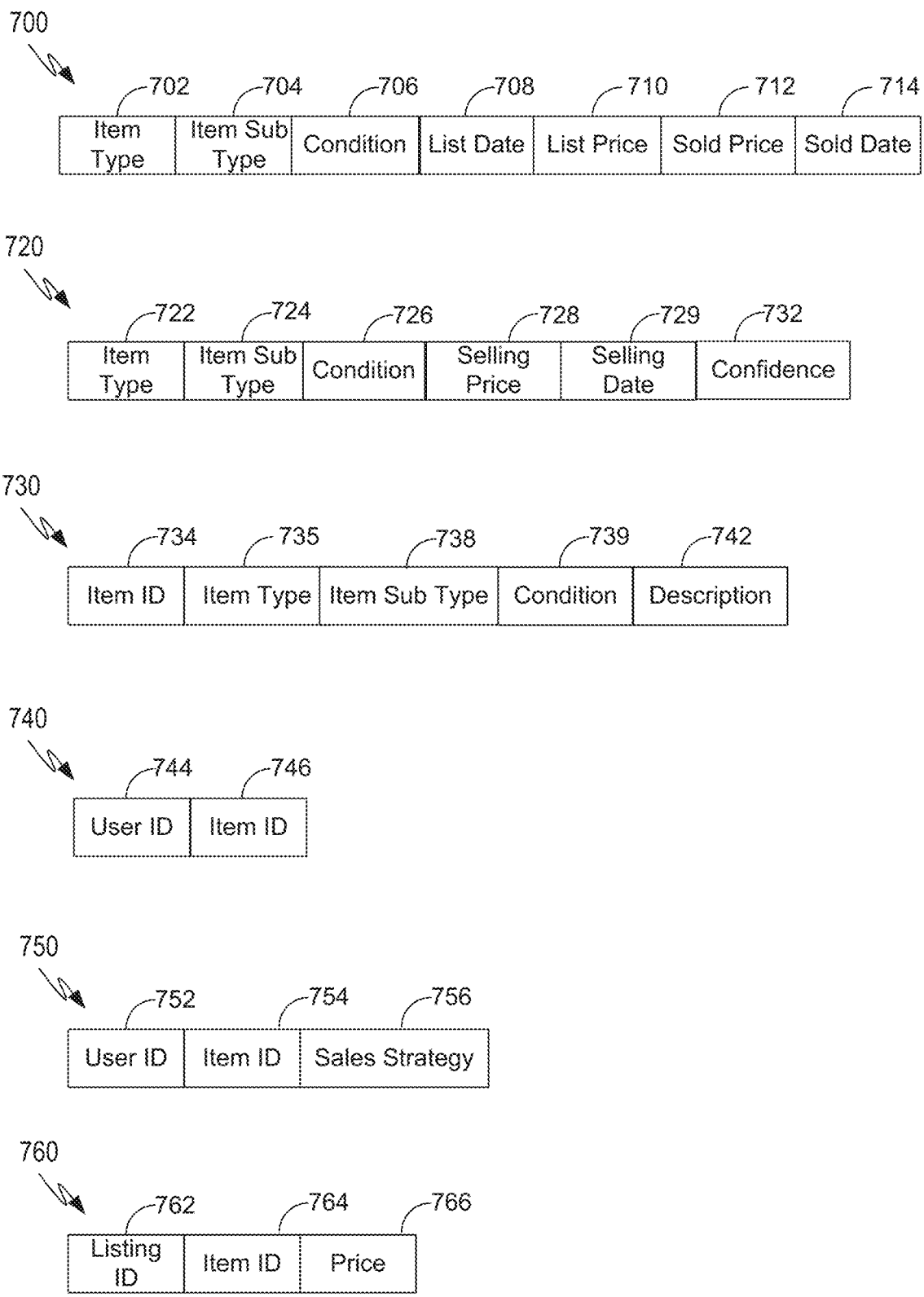
FIG. 7 shows example data structures that are implemented in at least some of the disclosed embodiments.

FIG. 7 shows example data structures implemented in at least some of the disclosed embodiments. The data structures discussed below are implemented in some aspects, as relational database tables. In other aspects, the data structures are implemented as in memory structures, such as arrays or linked lists. FIG. 7 is intended to demonstrate the nature of data maintained by some of the disclosed embodiments and the relationships of the data to each other.

Table 700 stores listing records. The listing records store historical results of previous item listings that have been listed and/or sold in an item listing system. Each listing record stores an item type 702, item sub type 704, item condition 706, listing date 708, listing price 710, sold price 712, and a sold date 714. The table 700 is used by at least some of the disclosed embodiments to generate predictions of future sales prices over future time periods for items with similarities to those included in the listing records of table 700. In some aspects, the disclosed embodiments generate prediction intervals, confidence intervals, and/or credible intervals. In some aspects, the intervals may be generated via one or more machine learning models. For example, a model may be trained by providing the model with parameters describing the item, such as a category of the item, type of item, sub type of the item, or other descriptive parameters. The model may also be provided with sales prices at particular sales dates. The model may then be used to predict sales prices of similar items at future sales dates. An example architecture for such a model is discussed below with respect to FIG. 17.

FIG. 7 also shows a prediction table or database 720. Each record of the prediction table includes an item type 722, item sub type 724, condition 726, selling price 728, selling date 729, and confidence value 732. Each record in the prediction table 720 stores a predicted selling price 728 and selling date 730 at the defined confidence 732. The records of the prediction table 720 may be generated by a prediction engine, as discussed below. In some aspects, the selling price 728 may store a selling price range, such as a prediction interval at a time defined by the selling date 729. In other aspects, the selling price 728 may represent a single selling price 728, which, in some aspects, may be an average or mid point of a prediction interval at the selling date 729.

FIG. 7 also shows an item table or database 730. The item database 730 stores information relating to items that are managed by one or more of the disclosed embodiments. The item database 730 includes an item identifier 734 that uniquely identifies an item. The item database 730 also includes an item type field 735, item sub type field 738, a condition of the item 739, and a description of the item 742.

FIG. 7 also shows an example user item table 740. The user item table 740 records which users own which items. Each record in the user item table 740 includes a user identifier 744, which uniquely identifies a user, and an item identifier 746, which uniquely identifies an item. The item identifier field 746 may be cross referenced with the item identifier 734.

FIG. 7 also shows a user settings table 750. The user settings table 750 includes a user identifier 752, an item identifier 754, and a sales strategy 756. The user identifier 752 uniquely identifies a user, and may be cross referenced with the user identifier 744. The item identifier 754 uniquely identifies an item and may be cross referenced with the item identifier 746 and/or 734. The sales strategy may define parameters to control automatic listing of an item corresponding to the item identifier 754 when particular parameters are met. The parameters stored in the sales strategy field 756 may be set via a user interface 815 displayed by the user interface engine 805, discussed below. For example, one or more of the user interfaces 100, 200, or 300 may set the parameters stored in the sales strategy field 756.

FIG. 7 also shows a listing database 760. The listing database stores items that are listed for sale. The items may be listed for sale on an ecommerce site in some embodiments. The listing database 760 includes a listing identifier 762, item identifier 764, and price 766. The listing identifier 762 uniquely identifies a listing. The item identifier 764 uniquely identifies an item that is listed for sale, and may be cross referenced with one or more of the item identifier 754, item identifier 746, or item identifier 734. The price 766 identifies a price at which the item (identified by item id 764) is listed for sale. In some aspects, the price 766 may be set based on predictions, such as those demonstrated in FIG. 4 and/or FIG. 5, generated by a prediction engine, discussed below.

Figure 8:
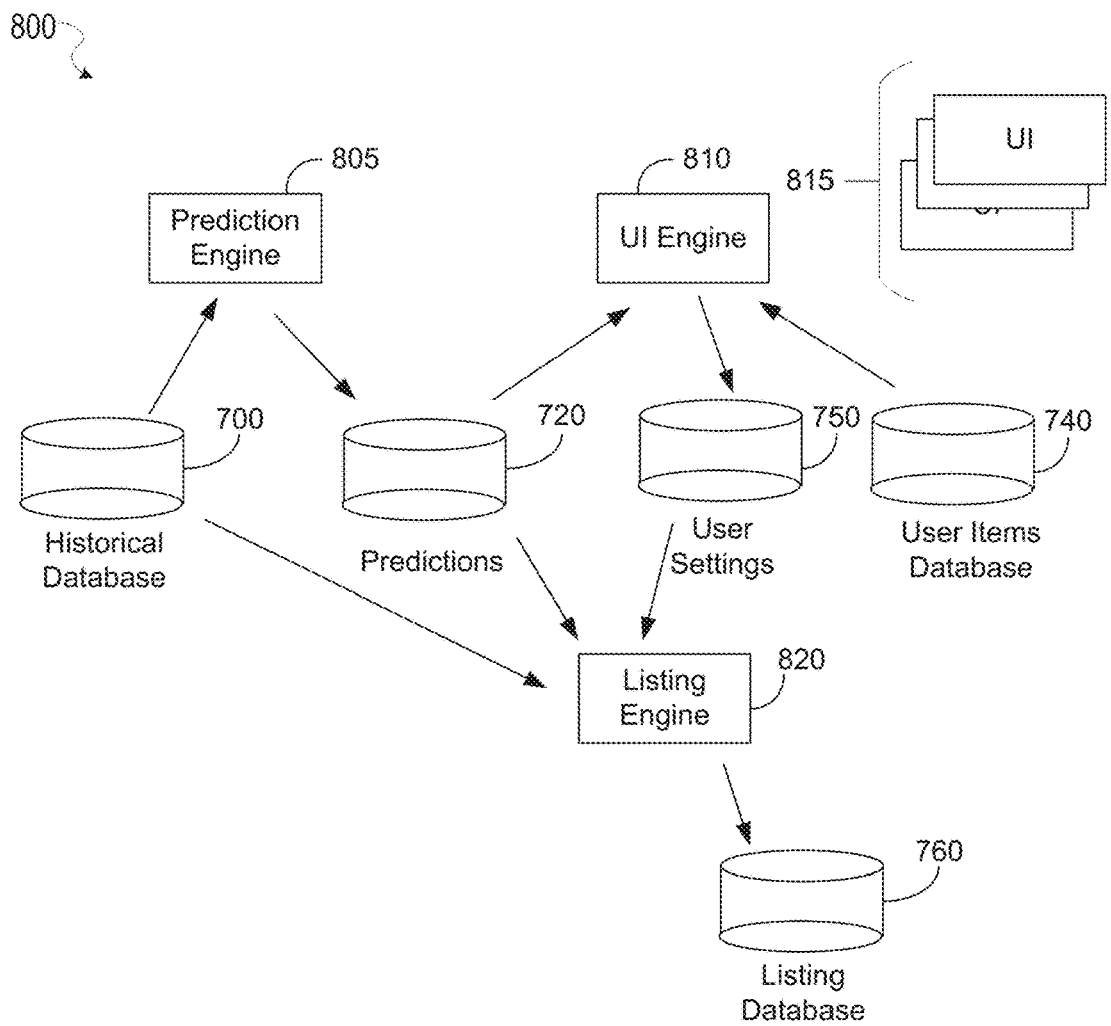
FIG. 8 shows an example dataflow that are implemented in at least some of the disclosed embodiments.

FIG. 8 shows an example dataflow 800 implemented in at least some of the disclosed embodiments. FIG. 8 shows that a prediction engine 805 reads the historical database 700 to generate predictions stored in the prediction database 720. A user interface engine 810 reads the predictions 720, and information relating to user items 740 to generate one or more user interfaces 815. The user interfaces 815 include, for example, the example user interfaces 100 and/or 200 illustrated above with respect to FIGS. 1 and 2 respectively. One result of the user interfaces 815 may be user settings that are stored in the user settings database 740. The user settings define listing criterion based on predictions stored in the predictions database 720. A listing engine 820 reads data included in one or more of the historical database 700, predictions database 720, user items database 740, and user settings 750 to determine whether to initiate a listing of a particular item. If a listing is initiated, the listing is stored in the listing database 760.

Each of the prediction engine 805, ui engine 810, and listing engine 820 represent instructions that may be stored in an electronic hardware memory. The instructions configure hardware processing circuitry to perform one or more of the functions discussed above with respect to the respective prediction engine 805, UI engine 810, and/or listing engine 820.

Figure 9:
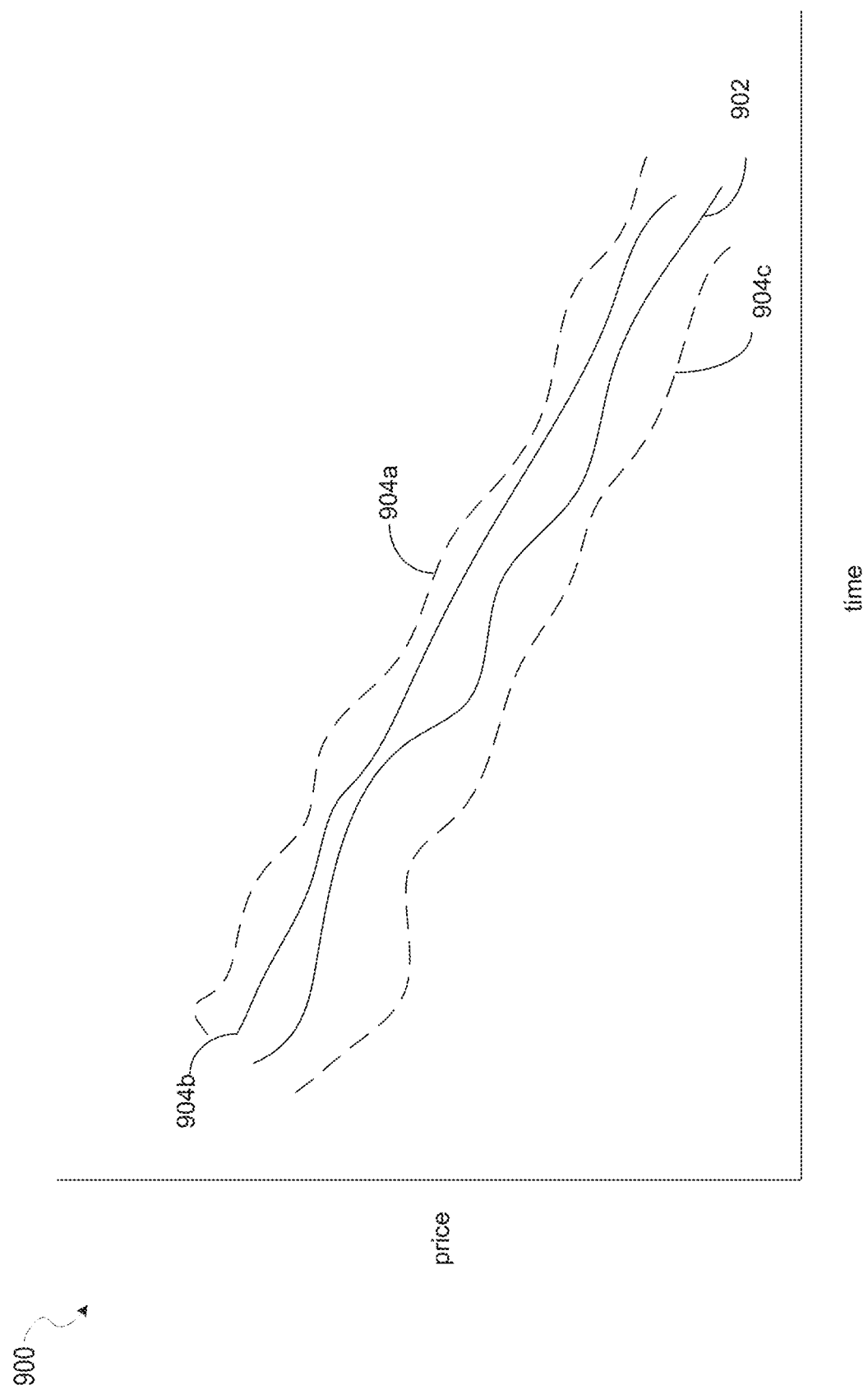
FIG. 9 shows a graph of a market price for an item and three sets of predictions 904a-c for sales prices of the item.

FIG. 9 shows a graph 900 of an estimated market price for an item and three sets of predictions 904a-c for sales prices of the item. An estimated market price over time is shown as line 902. The estimated market price 902 for a product may be generated based on an aggregation of multiple sales prices for a particular product type. In some aspects, the multiple sales prices may be averaged, or a median sales price determined to generate the estimated market price 902. The estimated market price may be based on the predictions 904a-c in some embodiments. A first prediction for sales prices is shown as line 904a. The predicted sales prices represented by line 904a are generally higher at a particular time than the market price. Thus, the predicted sales prices represented by line 904a have a lower probability of resulting in a sale of the item than sales prices represented by a second line 904b, which defines predicted sales prices at a particular time lower than the line 904a. Sales prices represented by line 904c may have a higher probability of completing a sale of the item than either of the sales prices represented by lines 904a or line 904b. Embodiments of this disclosure may periodically update predictions represented by the lines 904a-c based on additional sales price information. For example, as discussed above, parameters for an automatic relisting and/or resale of an item may be based on a first version of one or more of the lines 904a-c or 902. Updating of one or more of the predictions represented by lines 904a-c may also cause a change in the predictions 902, which may be generated based on aggregating the predictions 904a-c.

Figure 10:
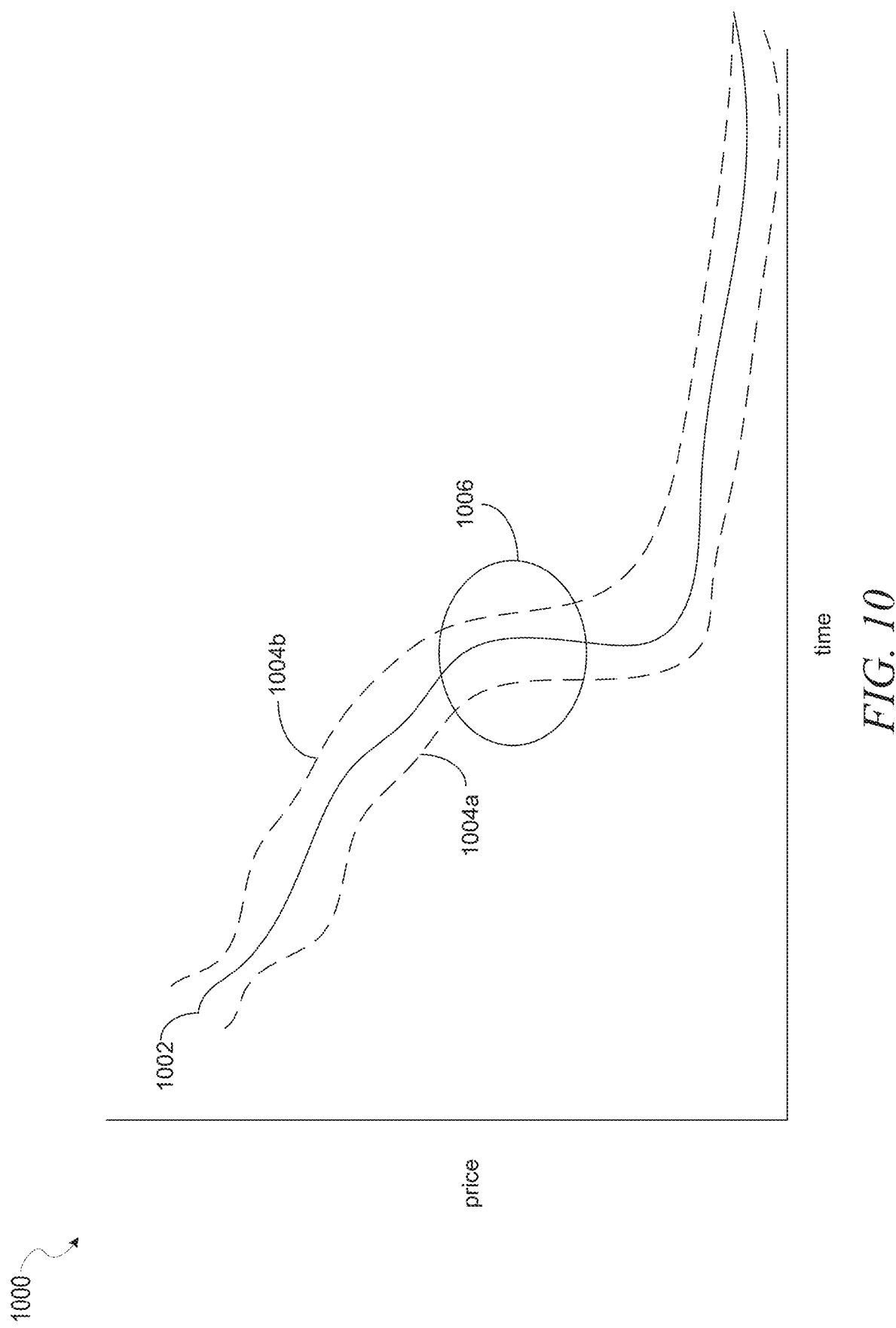
FIG. 10 demonstrates how predictions made by embodiments of this disclosure are updated periodically based on market price information.

FIG. 10 demonstrates how predictions made by embodiments of this disclosure may be updated periodically based on market price information. FIG. 10 shows an estimated market price of an item over time, represented as line 1002. Lines 1004a and 1004b represent predictions of sales prices for the item over time at different confidence levels. Similar to line 902 in FIG. 9, the estimated market price shown by line 1002 may be generated based on data representing multiple sales transactions at a variety of market prices. The estimated market price may be based on an average or median value of sales prices during a time period in various aspects. Line 1004a represents predictions at a first confidence level, and line 1004b represents predictions at a second confidence level. The predictions represented by the lines 1004a and 1004b are periodically updated based on the market price information represented by line 1002. For example, in the region of the graph shown as 1006, the market price demonstrates an unpredicted decrease. This may be the result of a variety of factors, such as weather, reputation of the item, etc. Graph 1000 of FIG. 10 shows that by at least some of the disclosed embodiments periodically updating their predictions based on market price information, the predictions for a given confidence level may maintain their confidence levels over time. For example, if the predictions were not updated based on market price information, a prediction that had a 95% confidence level on March 1 has a lower confidence level (e.g. 30% confidence level) at a later time. In embodiments that set the sale price of items based on confidence levels, updating the predictions assists in ensuring that the user's desired confidence level for a sale is maintained over time.

Figure 11:
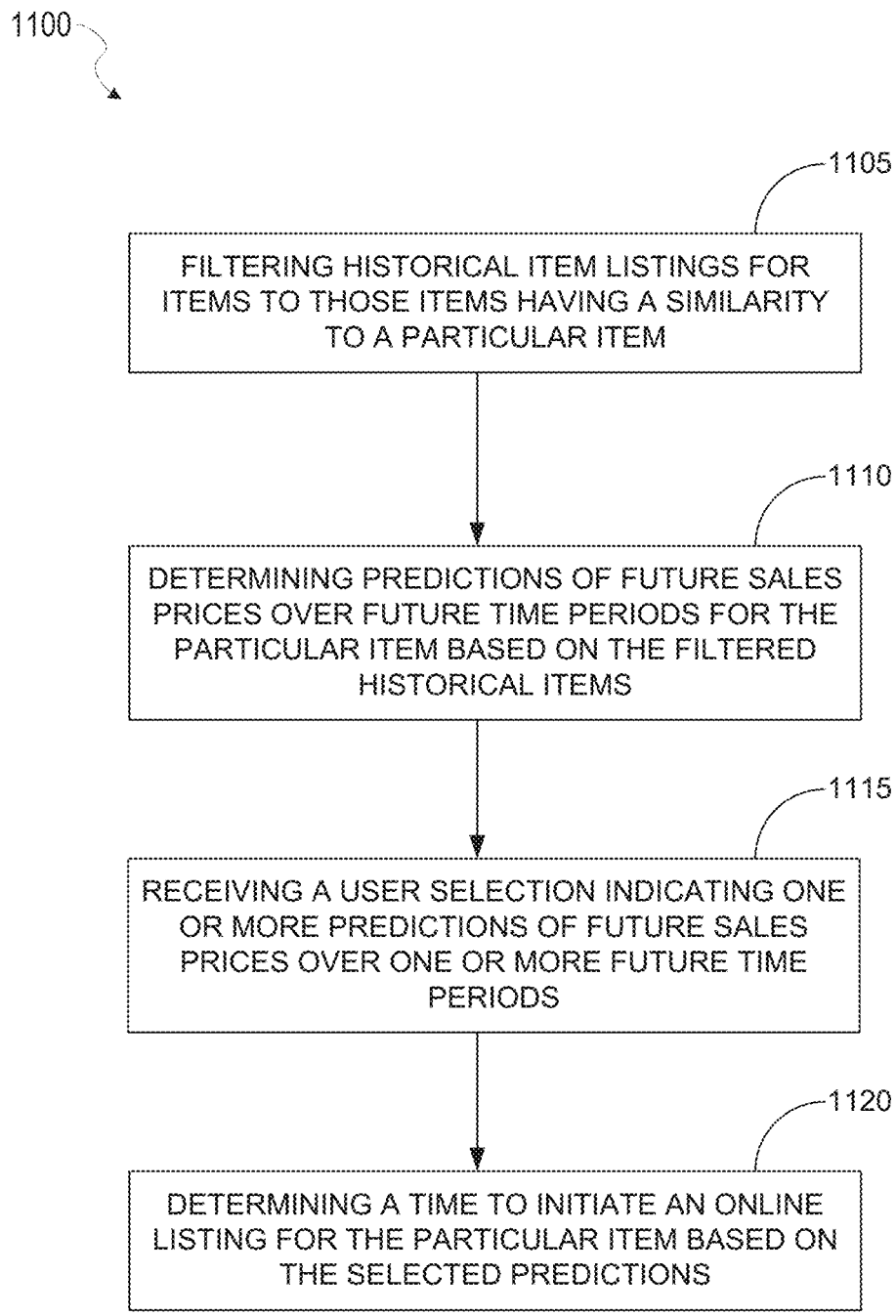
FIG. 11 is a flowchart of a method of determining how to initiate an online listing for an item.

FIG. 11 is a flowchart of a method of determining how to initiate publication of an online listing for an item. In some aspects, one or more of the functions discussed below with respect to FIG. 11 may be performed by hardware processing circuitry. For example, an electronic memory may store instructions that when executed by the hardware processing circuitry, configure the hardware processing circuitry to perform one or more of the functions discussed below.

In operation 1105, historical item listings for items are filtered. The filtering identifies items from the historical item listings that have a similarity to a particular item. For example, the identified items may have an equivalent item type (e.g., 722) and/or item sub type (e.g., 724) as the particular item (e.g., via item type 735 and/or item sub type 738). Some aspects may have a similar or equivalent condition (e.g. 726) as the particular item (e.g., 739). In some aspects, the historical item listings are filtered to include a mix of products having different item types or item sub types.

In operation 1110, predictions of future sales prices over future time periods are determined for the particular item. The predictions are based on the filtered historical items. For example, in some aspects, the filtered historical item listings include sold prices of the historical items for sales transactions occurring at particular times. From this information, operation 1110 determines how the particular item depreciates (or appreciates) over time from a new condition or from a given condition. In some aspects, operation 1110 employs interval estimation, such as confidence intervals, credible intervals, tolerance intervals, prediction intervals, or likelihood intervals to determine the predictions. In some aspects, sales price predictions providing different probabilities of a completed sales transaction are generated. Thus, a first set of sales price predictions over time may be generated that provides a 95% probability that the item will sell at a sales price and time defined by the prediction. A second set of sales price predictions over time may be generated that provides a 80% probability that the item will sell at a sales price and time defined by the prediction, and so on.

In operation 1115, a user selection is received indicating one or more of the predictions of future sales prices over one or more future time periods. Some aspects of operation 1115 causes display of a user interface (e.g., 100 and/or 200). The user interface may include a graph of at least some of the predicted future sales prices over the future time periods for the particular item determined in operation 1110. In these aspects, touch inputs on the graph may be received. The touch inputs define a rectangle overlaying the graph. The rectangle encompasses a subset of the future sales prices and their corresponding future time periods displayed on the graph. This subset of future sales prices at future times define acceptable sales criterion for the item. This information may be stored in the user settings database (e.g, 750). For example, in some aspects, the sales strategy field 756 stores the acceptable sales criterion. These aspects may also monitor a current market price of items having a similarity to the particular item. For example, some aspects periodically fetch records from the historical database 700 for items sold within a previous time period, including a threshold number of one or more minutes hours, days, weeks, or months. A current market price for the item is then determined, for example, by averaging selling prices for similar items with the previous time period.

Some aspects cause display of a user interface configured to receive a retained value of the particular item (e.g., 202). The user interface is further configured to display a plurality of controls, each control configured to select a different confidence interval for retaining the value over different associated time periods (e.g., 204a and 204b). In some aspects, this user interface provides a selectable control, where selection of the control indicates an alert is to be provided to the user if an actual market price (e.g., via the monitoring of market prices described above) of the item deviates from the predictions by more than a threshold amount. The threshold may also be configurable via the user interface. The threshold may be provided as a percentage or an absolute amount. In these aspects, operation 1115 receives a selection of a particular confidence interval of the different confidence intervals. Selecting the confidence interval also inherently selects a set of predictions. For example, if multiple predictions for multiple confidence intervals are generated in operation 1110, the selection of the confidence interval makes the predictions at the selected confidence interval relevant to operation 1120, discussed below.

Some embodiments may cause display of a user interface configured to display a plurality of controls, each control selectable to define different rules for setting a sales price of the particular item (e.g. 102a-b). At least one of the controls is selectable to define a rule setting a sales price so as to maintain a fixed probability of sale completion of the item over time based on the predictions. For example, as discussed above with respect to FIG. 1, the user interface 100 provides for the user to select a sales strategy that varies a selling price of an online listing of an item (e.g. 760) to maintain a fixed probability of sale over time. In other words, these embodiments set a selling price, for example, according to a line such as any one of lines 904a-c of FIG. 9 or any one of lines 1004a-b of FIG. 10. As discussed above, the predictions upon which the fixed probability is maintained may be adjusted periodically based on new or recent historical sales transactions for the item (e.g. from historical listing database 700). The user interface is configured to receive input defining the fixed probability of sale (e.g., via edit box 104a). This fixed probability of sale determines a prediction, such as one of the predictions represented by the lines 904a-c to be applied in operation 1120. In some aspects, the user interface provides a selectable control (e.g., 102b) that sets a fixed selling price over time (e.g., which may be indicated via edit control 104b).

In operation 1120, a time to initiate an online listing for the particular item based on the selected predictions is determined. In the embodiments discussed above that receive touch inputs defining a rectangle of acceptable sales prices and times, if the monitored market price calls within the rectangle defined by the graph, an online listing is initiated at that time. Initiating an online listing may include generating a user interface that includes an item description, and one or more pictures representing the item. The user interface may also indicate a sales price for the item. The online listing may be published on an online listing system, that provides for users of the online listing system to search for items based on one or more criterion. When the item satisfies the one or more criterion, the online listing for the item may be displayed on an electronic display. As some embodiments of process 1100 may be performed by server components, such as the application server 1240 discussed below, publication of the online listing may cause display of the online listing on a user device. For example, causing display may include transmitting data to the user device, the data defining a user interface to be displayed on the user device (such as XML or HTML data, or a combination of these).

Figure 12:
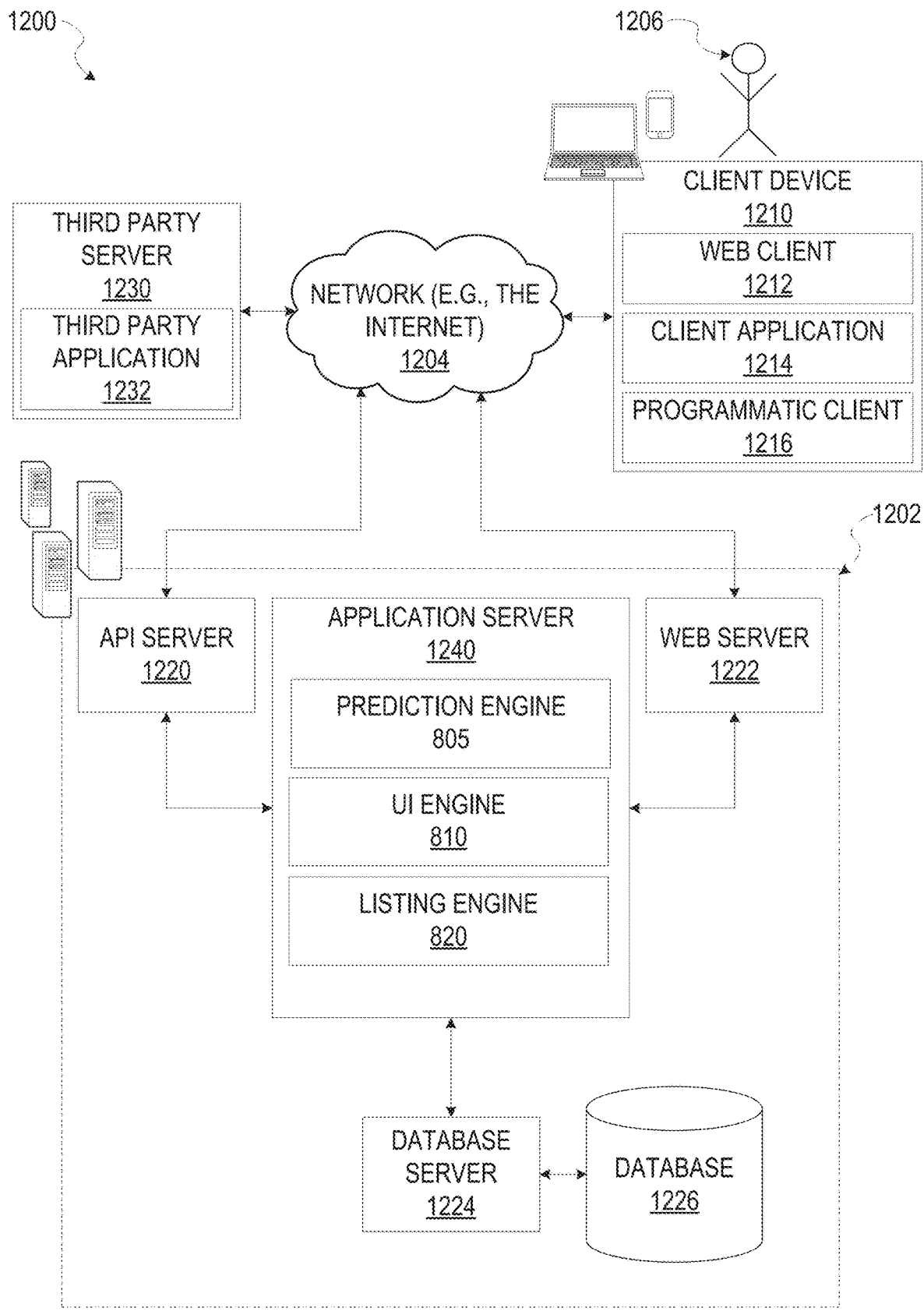
FIG. 12 is a block diagram of an exemplary client-server-based architecture.

FIG. 12 is a block diagram of an exemplary client-server-based architecture 1200. While FIG. 12 depicts the client-server-based architecture 1200, the present inventive subject matter is, of course, not limited to such an architecture, and could equally well find application in an event-driven, distributed, or peer-to-peer architecture system, for example. Further, to avoid obscuring the inventive subject matter with unnecessary detail, various functional components that are not germane to conveying an understanding of the inventive subject matter have been omitted from FIG. 12. Moreover, it shall be appreciated that although the various functional components illustrated in FIG. 12 are discussed in a singular sense, multiple instances of any one of the various functional components may be employed.

A content publication platform 1202, in the example form of a network-based system, provides server-side functionality via a network 1204 (e.g., the Internet or wide area network (WAN)) to one or more client devices 1210. In some aspects, the content publication platform 1202 may implement an item listing system. The item listing system may provide for the publication of ecommerce listings that facilitate providing items for sale.

FIG. 12 illustrates, for example, a web client 1212 (e.g., a browser), a client application 1214, and a programmatic client 1216 executing on the client device 1210. The client device 1210 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the content publication platform 1202. In some embodiments, the client device 1210 comprises a display module (not shown) to display information (e.g., in the form of user interfaces). In further embodiments, the client device 1210 comprises one or more of a touch screens, accelerometers, gyroscopes, cameras, microphones, global positioning system (GPS) devices, and so forth. In one embodiment, the content publication platform 1202 is a network-based marketplace that publishes publications (e.g., web documents) comprising item listings of products available on the network-based marketplace.

One or more users 1206 may be a person, a machine, or other means of interacting with client device 1210. In example embodiments, the user 1206 is not part of the client-server-based architecture 1200, but interacts with the client-server-based architecture 1200 via the client device 1210 or another means. For example, the user 1206 may provide input (e.g., touch screen input or alphanumeric input) to the client device 1210, and the input is communicated to the content publication platform 1202 via a network 1204. In this instance, the content publication platform 1202, in response to receiving the input from the user 1206, communicates information (e.g., user interfaces) to the client device 1210 via the network 1204 to be presented to the user 1206. In this way, the user 1206 can interact with the content publication platform 1202 using the client device 1210.

The client device 1210 may include one or more client applications 1214 (also referred to as "apps") such as, but not limited to, a web browser, messaging application, electronic mail (email) application, an e-commerce site application (also referred to as a marketplace application), and the like. In some embodiments, if the e-commerce site application is included in the client device 1210, then this application is configured to locally provide the user interface and at least some of the functionalities with the client application 1214 configured to communicate with the content publication platform 1202, on an as needed basis, for data or processing capabilities not locally available (e.g., access to a database of items available for sale, to authenticate the user 1206, to verify a method of payment). Conversely if the e-commerce site application is not included in the client device 1210, the client device 1210 may use its web browser to access the e-commerce site (or a variant thereof) hosted on the content publication platform 102.

One or more portions of network 1204 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

An application program interface (API) server 1220 and a web server 1222 are coupled to, and provide programmatic and web interfaces respectively to an application server 1240. The application server 1240 hosts the prediction engine 805, UI engine 810, and listing engine 820, which may be embodied as hardware, software, firmware, or any combination thereof.

The application server 1240 is, in turn, shown coupled to a database server 1224 that facilitate access to database 1226. In an example embodiment, the database 1226 is a storage device that stores information such as any of the data structures discussed above with respect to FIG. 7. The databases 1226 may also store digital item information in accordance with example embodiments.

Additionally, a third party application 1232, executing on a third party server 1230, is shown as having programmatic access to the content publication platform 1202 via the programmatic interface provided by the API server 1220. For example, the third party application 1232, utilizing information retrieved from the content publication platform 1202, supports one or more features or functions on a website hosted by the third party.

Figure 13:
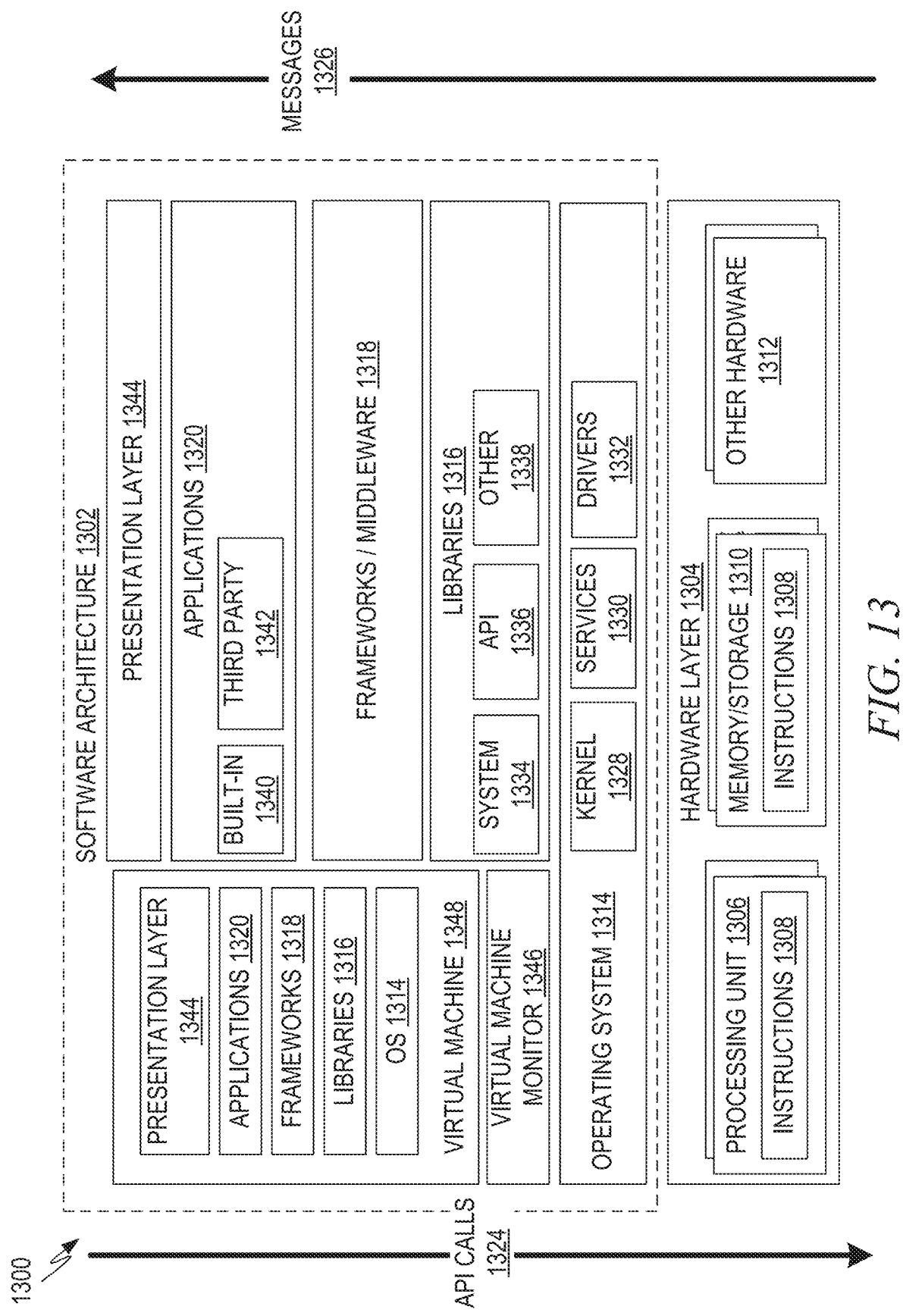
FIG. 13 is a block diagram illustrating a representative software architecture, which may be used in conjunction with various hardware architectures herein.

FIG. 13 is a block diagram 1300 illustrating a representative software architecture 1302, which may be used in conjunction with various hardware architectures herein described. FIG. 13 is merely a non-limiting example of a software architecture and it will be appreciated that many other architectures may be implemented to facilitate the functionality described herein. The software architecture 1302 may be executing on hardware such as machine 1400 of FIG. 14 that includes, among other things, processors 1410, memory 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. Executable instructions 1308 represent the executable instructions of the software architecture 1302, including implementation of the methodologies and modules and so forth described above. Hardware layer 1304 also includes memory and/or storage modules 1310, which also have executable instructions 1308. Hardware layer 1304 may also comprise other hardware as indicated by 1312 which represents any other hardware of the hardware layer 1304, such as the other hardware illustrated as part of machine 1400, discussed below.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320 and presentation layer 1344. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature and not all software architectures have all layers. For example, some mobile or special purpose operating systems may not provide a frameworks/middleware layer 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330, and/or drivers 1332). The libraries 1316 may include system 1334 libraries (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks/middleware 1318 (also sometimes referred to as "middleware) may provide a higher-level common infrastructure that may be utilized by the applications 1320 and/or other software components/modules. For example, the frameworks 1318 may provide various graphic user interface (GUI) functions, high-level resource management, high-level location services, and so forth. The frameworks 1318 may provide a broad spectrum of other APIs that may be utilized by the applications 1320 and/or other software components/modules, some of which may be specific to a particular operating system or platform.

The applications 1320 includes built-in applications 1340 and/or third party applications 1342. Examples of representative built-in applications 1340 may include, but are not limited to, a contacts application, a browser application, a book reader application, a location application, a media application, a messaging application, and/or a game application. Third party applications 1342 may include any of the built in applications as well as a broad assortment of other applications. In a specific example, the third party application 1342 (e.g., an application developed using the Android™ or iOS™ software development kit (SDK) by an entity other than the vendor of the particular platform) may be mobile software running on a 'mobile operating system such as iOS™, Android™, Windows® Phone, or other mobile operating systems. In this example, the third party application 1342 may invoke the API calls 1336 provided by the mobile operating system such as operating system 1314 to facilitate functionality described herein.

The applications 1320 may utilize built in operating system functions (e.g., kernel 1328, services 1330 and/or drivers 1332), libraries (e.g., system 1334, APIs 1336, and other libraries 1338), frameworks/middleware 1318 to create user interfaces to interact with users of the system. Alternatively, or additionally, in some systems interactions with a user may occur through a presentation layer, such as presentation layer 1344. In these systems, the application/module "logic" can be separated from the aspects of the application/module that interact with a user.

Some software architectures utilize virtual machines. In the example of FIG. 13, this is illustrated by virtual machine 1348. A virtual machine creates a software environment where applications/modules can execute as if they were executing on a hardware machine (such as the machine of FIG. 14, for example). A virtual machine is hosted by a host operating system (operating system 1314 in FIG. 13) and typically, although not always, has a virtual machine monitor 1346, which manages the operation of the virtual machine as well as the interface with the host operating system (i.e., operating system 1314). A software architecture executes within the virtual machine such as an operating system 1314, libraries 1316, frameworks/middleware 1318, applications 1320 and/or presentation layer 1344. These layers of software architecture executing within the virtual machine 1348 can be the same as corresponding layers previously described or may be different.

Figure 14:
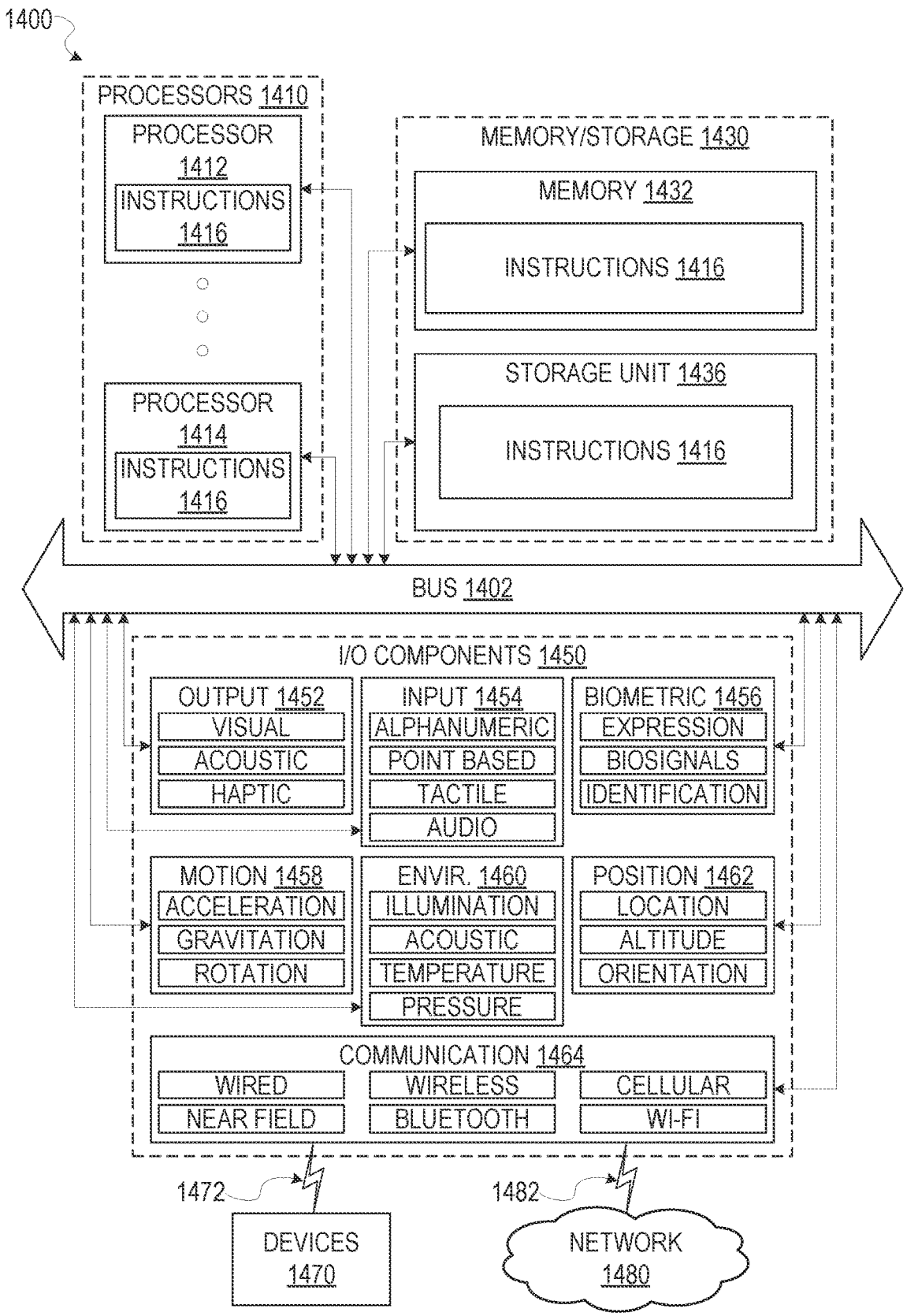
FIG. 14 is a block diagram illustrating components of a machine, according to some example embodiments, able to read instructions from a machine-readable medium and perform any of the methodologies discussed herein.

FIG. 14 is a block diagram illustrating components of the machine 1400, according to some example embodiments, able to read instructions from a machine-readable medium (e.g., a machine-readable storage device) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. These instructions transform the general, non-programmed machine into a particular machine programmed to carry out the described and illustrated methodologies in the manner described herein. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. By way of non-limiting example, the machine 1400 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include a multi-core processor 1410 that may comprise two or more independent processors (sometimes referred to as "cores") that may execute instructions contemporaneously. Although FIG. 14 shows multiple processors, the machine 1400 may include a single processor with a single core, a single processor with multiple cores (e.g., a multi-core processor), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store instructions and data temporarily or permanently, and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine (e.g., processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices.

Executable Instructions and Machine-Storage Medium

The various memories (i.e., 1430, 1432, and/or memory of the processor(s) 1410) and/or storage unit 1436 may store one or more sets of instructions and data structures (e.g., software) embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically exclude carrier waves, modulated data signals, transitory signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion, and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), acoustic sensor components (e.g., one or more microphones that detect background noise), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472 respectively. For example, the communication components 1464 may include a network interface component or other suitable device to interface with the network 1480. In further examples, the communication components 1464 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Figure 15:
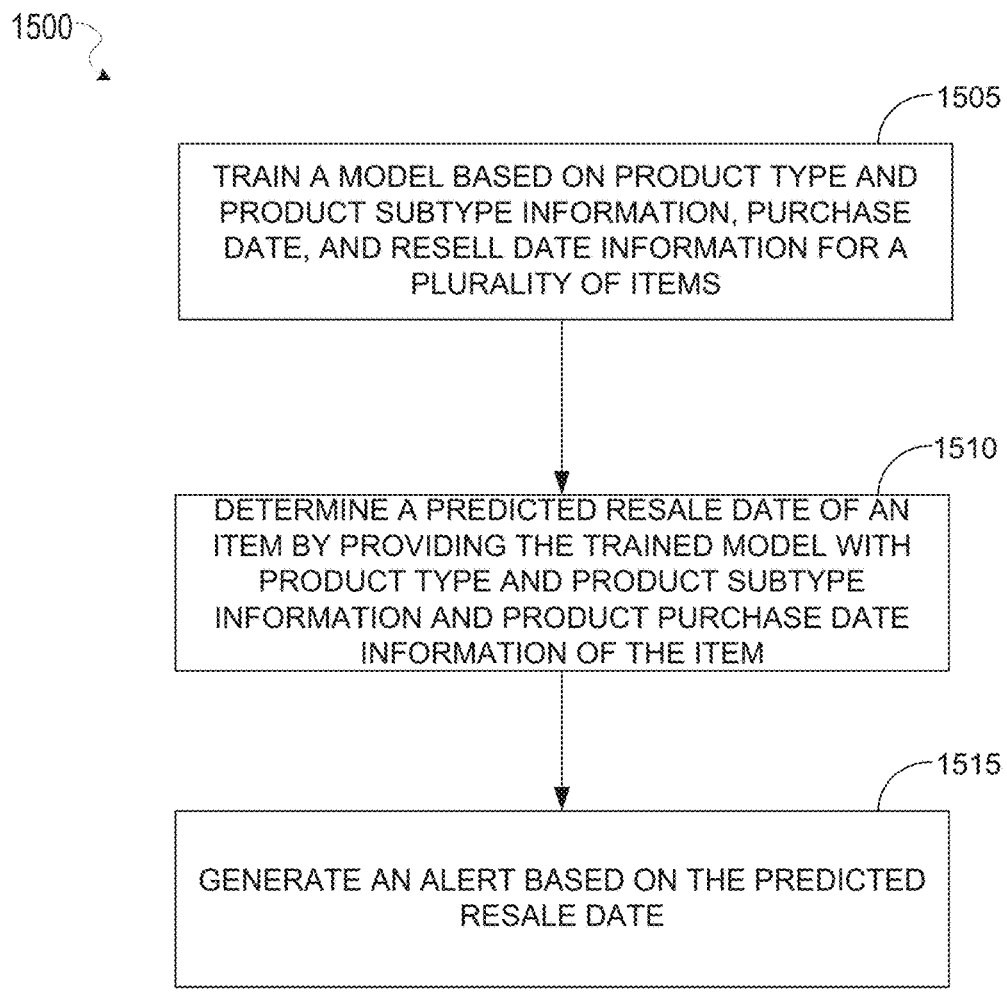
FIG. 15 is a flowchart of a method of generating an alert based on a predicted resale date.

FIG. 15 is a flowchart of a method 1500 of generating an alert based on a predicted resale date. In some aspects, one or more of the functions discussed below with respect to FIG. 15 may be performed by hardware processing circuitry. For example, an electronic memory may store instructions that when executed by the hardware processing circuitry, configure the hardware processing circuitry to perform one or more of the functions discussed below with respect to FIG. 15.

In operation 1505, a model is trained based on product type (e.g., 722) and product subtype (e.g. 724) information. The training may also be based on purchase date (e.g. 714) and/or resell date (e.g. 729) information. The training is performed for a plurality of items.

In operation 1510, a predicted resale date for an item is determined based on the trained model. The model may be provided with one or more of a purchase date, item type, and item subtype information. From this information, and based on the training performed in operation 1505, the model may predict a resale date for the item.

Figure 16:
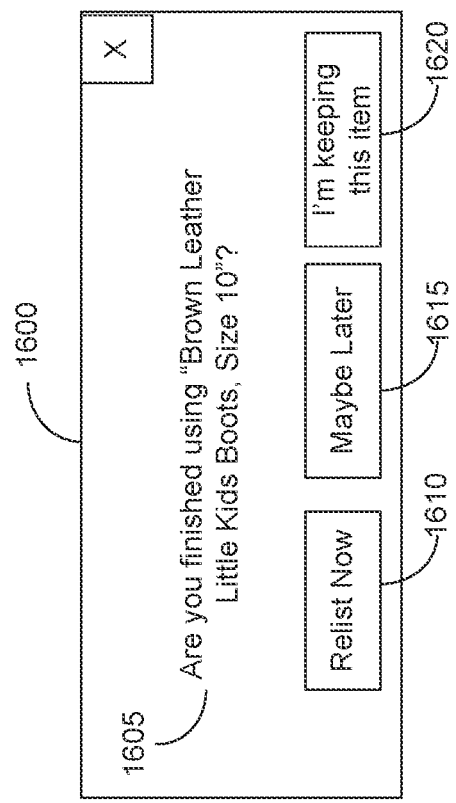
FIG. 16 is an example of a notification of a possible resale.

In operation 1515, an alert is generated based on the predicted resale date. FIG. 16 below shows one example of such an alert. However, the alert may take one or more forms, including text message, email message, pop up dialog, or other messaging method.

FIG. 16 is an example of a notification of a possible resale. The notification 1600 provides a prompt 1605 indicating that a usage time for a particular item may have elapsed. The notification 1600 also includes a relist button 1610, allowing the user to relist the item, a defer button 1615, which may defer the listing for a period of time, and a button indicating the user does not want to relist the item. The notification 1600 also includes a button 1620 to indicate the user is keeping the particular item.

Figure 17:
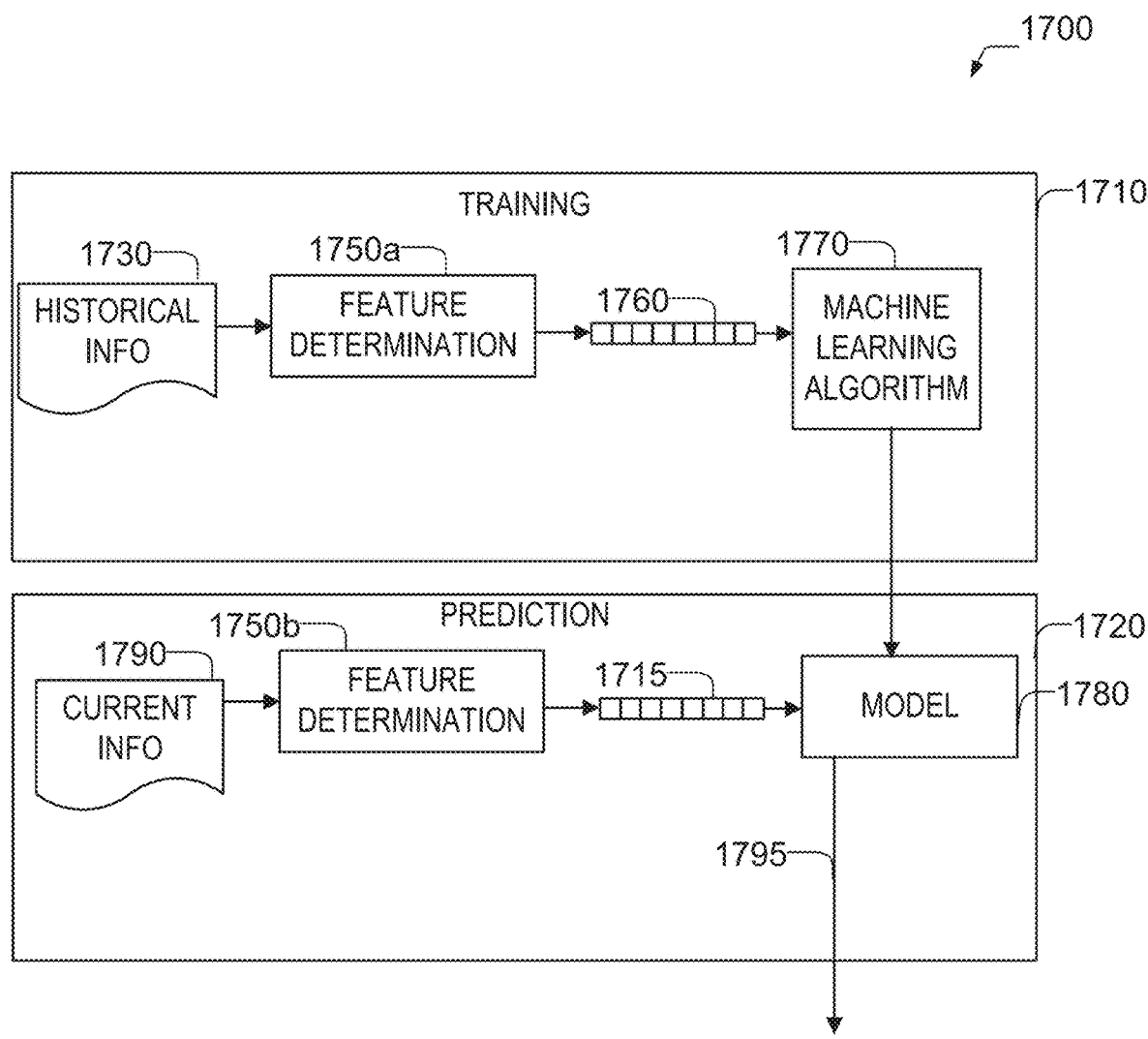
FIG. 17 shows an example machine learning module according to some examples of the present disclosure.

FIG. 17 shows an example machine learning module 1700 according to some examples of the present disclosure. Machine learning module 1700 utilizes a training module 1710 and a prediction module 1720. Training module 1710 inputs historical information 1730 into feature determination module 1750a. The historical information 1730 may be labeled. Example historical information may include information on items, including item listings dates, item types, item subtypes, item condition indications, item relisting dates, and other information regarding items.

Feature determination module 1750a determines one or more features 1760 from this historical information 1730. Stated generally, features 1760 are a set of the information input and is information determined to be predictive of a particular outcome. In some examples, the features 1760 may be all the historical activity data, but in other examples, the features 1760 may be a subset of the historical activity data. The machine learning algorithm 1770 produces a model 1780 based upon the features 1760 and the label.

In the prediction module 1720, current information 1790 may be input to the feature determination module 1750. Feature determination module 1750b may determine the same set of features or a different set of features from the current information 1790 as feature determination module 1750a determined from historical information 1730. In some examples, feature determination module 1750a and 1750b are the same module. Feature determination module 1750b produces feature vector 1715, which is input into the model 1780 to generate a likelihood of response score 1795. The training module 1710 may operate in an offline manner to train the model 1780. The prediction module 1720, however, may be designed to operate in an online manner. It should be noted that the model 1780 may be periodically updated via additional training and/or user feedback.

The machine learning algorithm 1770 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training module 1710. In an example embodiment, a regression model is used and the model 1780 is a vector of coefficients corresponding to a learned importance for each of the features in the vector of features 1760, 1715. To calculate a score, a dot product of the feature vector 1715 and the vector of coefficients of the model 1780 is taken.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

We claim:

1. A method performed by hardware processing circuitry, the method comprising
    providing item information for determining item predictions as training data to a machine learning model;
    training the machine learning model with the training data;
    filtering historical item listings for items having an equivalent type to a particular item;
    determining, based on past depreciation of the items being the equivalent type to the particular item, predictions for the particular item with the trained machine learning model, the predictions comprising a plurality of future sales prices over a corresponding plurality of future time periods, the predictions further including a corresponding plurality of different probabilities at different future time periods of the plurality of future time periods of sale completion associated with each of the plurality of future sales prices such that each future sales price of the plurality of future sales prices has a sales probability of sale completion for a time period within the plurality of future time periods;
    causing display of a user interface, the user interface configured to display a plurality of controls, each control selectable to define different rules for setting a sales price of the particular item, one of the controls selectable to define a rule setting a variable sales price so as to maintain a fixed probability of sale completion of the item over time based on the predictions such that the variable sales price varies over time in order to maintain the fixed probability over time;
    receiving input selecting one of the plurality of controls;
    determining a time to initiate publication of an online listing for the particular item; and
    automatically publishing the online listing for the particular item in an online listing system in accordance with the determined time.

2. The method of claim 1, wherein the publishing of the online listing sets a sales price of the particular item in the online listing according to a rule defined by the selected control.

3. The method of claim 1, further comprising:
    monitoring recent completed item listings to determine a current market value for the particular item;
    comparing the current market value to a predicted value from the predictions of future sales prices for a current time period; and
    generating an alert if a difference between the current market value and the predicted value meet one or more criterion.

4. The method of claim 3, wherein generating the alert comprises causing display of a notification user interface, the notification user interface configured to display at least two selectable controls, a first control configured to indicate a sales strategy for the item is to be reviewed upon selection of the first control, and a second control configured to indicate the sales strategy is to be maintained upon selection of the second control.

5. The method of claim 1, wherein the determining of the predictions comprises interval estimation.

6. The method of claim 5, wherein the determining of the predictions comprises determining one or more of confidence intervals, credible intervals, tolerance intervals, prediction intervals, or likelihood intervals.

7. A system comprising:
    hardware processing circuitry;
    a hardware memory storing instructions that when executed configure the hardware processing circuitry to perform operations comprising:
        providing item information for determining item predictions as training data to a machine learning model;
        training the machine learning model with the training data;
            filtering historical item listings for items having an equivalent type to a particular item;
            determining, based on past depreciation of the items being the equivalent type to the particular item, predictions for the particular item with the trained machine learning model, the predictions comprising a plurality of future sales prices over a corresponding plurality of future time periods, the predictions further including a corresponding plurality of different probabilities at different future time periods of the plurality of future time periods of sale completion associated with each of the plurality of future sales prices such that each future sales price of the plurality of future sales prices has a sales probability of sale completion for a time period within the plurality of future time periods;
        causing display of a user interface, the user interface configured to display a plurality of controls, each control selectable to define different rules for setting a sales price of the particular item, one of the controls selectable to define a rule setting a variable sales price so as to maintain a fixed probability of sale completion of the item over time based on the predictions such that the variable sales price varies over time in order to maintain the fixed probability over time;
        receiving input selecting one of the plurality of controls;
        determining a time to initiate publication of an online listing for the particular item; and
        automatically publishing the online listing for the particular item in an online listing system in accordance with the determined time.

8. The system of claim 7, wherein the publishing of the online listing sets a sales price of the particular item in the online listing according to a rule defined by the selected control.

9. The system of claim 7, the operations further comprising:
    monitoring recent completed item listings to determine a current market value for the particular item;
    comparing the current market value to a predicted value from the predictions of future sales prices for a current time period; and
    generating an alert if a difference between the current market value and the predicted value meet one or more criterion.

10. The system of claim 9, wherein generating the alert comprises causing display of a notification user interface, the notification user interface configured to display at least two selectable controls, a first control configured to indicate a sales strategy for the item is to be reviewed upon selection of the first control, and a second control configured to indicate the sales strategy is to be maintained upon selection of the second control.

11. The system of claim 7, wherein the determining of the predictions comprises interval estimation.

12. The system of claim 11, wherein the determining of the predictions comprises determining one or more of confidence intervals, credible intervals, tolerance intervals, prediction intervals, or likelihood intervals.

13. A non-transitory computer readable storage medium comprising instructions that when executed configure hardware processing circuitry to perform operations comprising:
- providing item information for determining item predictions as training data to a machine learning model;
- training the machine learning model with the training data;
- filtering historical item listings for items having an equivalent type to a particular item;
- determining, based on past depreciation of the items being the equivalent type to the particular item, predictions for the particular item with the trained machine learning model, the predictions comprising a plurality of future sales prices over a corresponding plurality of future time periods the predictions further including a corresponding plurality of different probabilities at different future time periods of the plurality of future time periods of sale completion associated with each of the plurality of future sales prices such that each future sales price of the plurality of future sales prices has a sales probability of sale completion for a time period within the plurality of future time periods;
- causing display of a user interface, the user interface configured to display a plurality of controls, each control selectable to define different rules for setting a sales price of the particular item, one of the controls selectable to define a rule setting a variable sales price so as to maintain a fixed probability of sale completion of the item over time based on the predictions such that the variable sales price varies over time in order to maintain the fixed probability over time;
- receiving input selecting one of the plurality of controls;
- determining a time to initiate publication of an online listing for the particular item; and
- automatically publishing the online listing for the particular item in an online listing system in accordance with the determined time.

* * * * *